Figure 1:
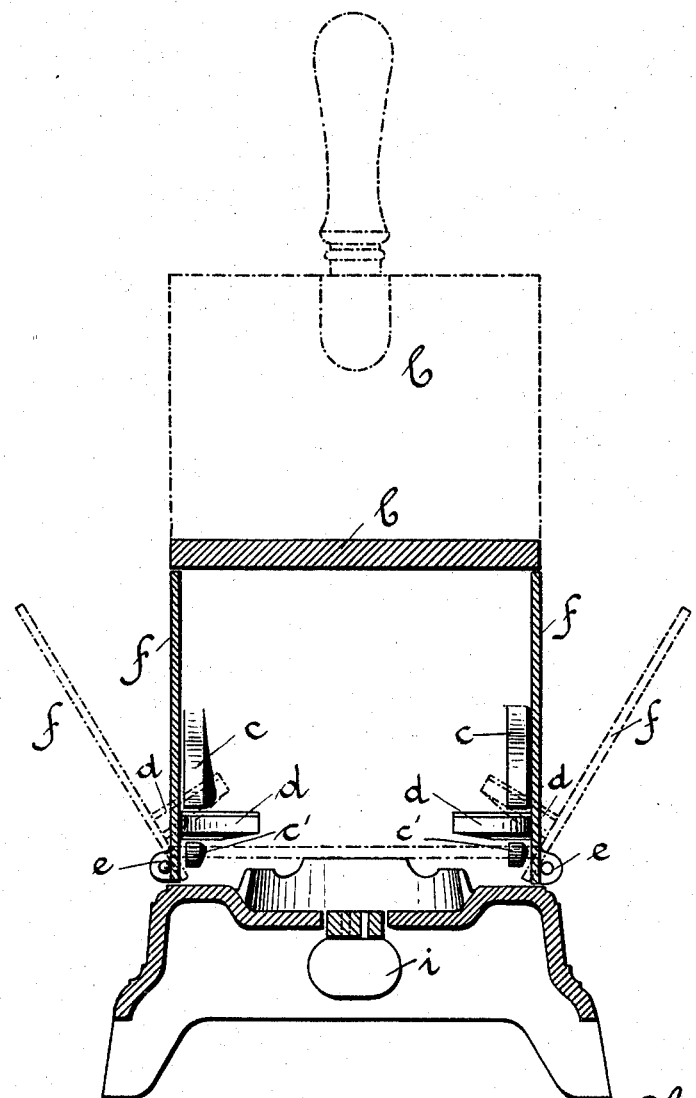

(No Model.) 2 Sheets—Sheet 2.
E. A. OSSWALD & C. M. KIRCHGESSNER.
HEATING DEVICE USED IN MAKING OR RENOVATING HATS.
No. 590,236. Patented Sept. 21, 1897.
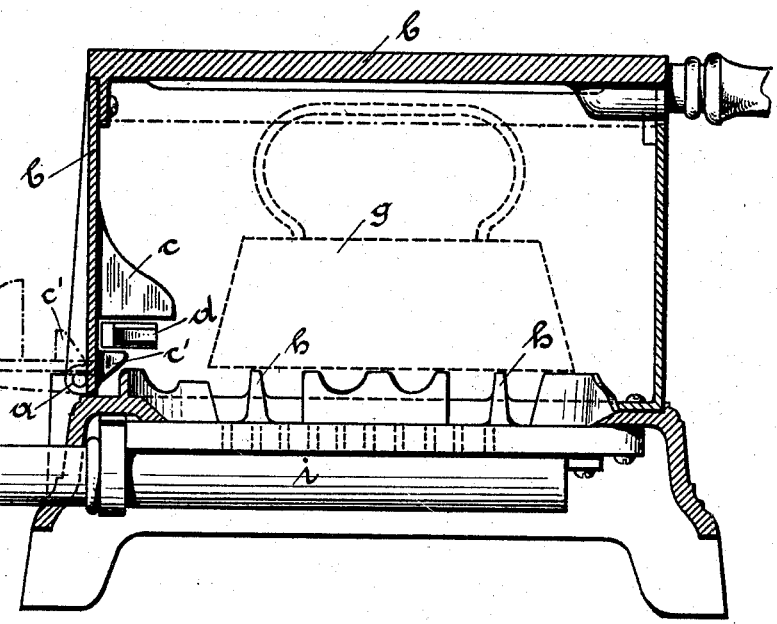
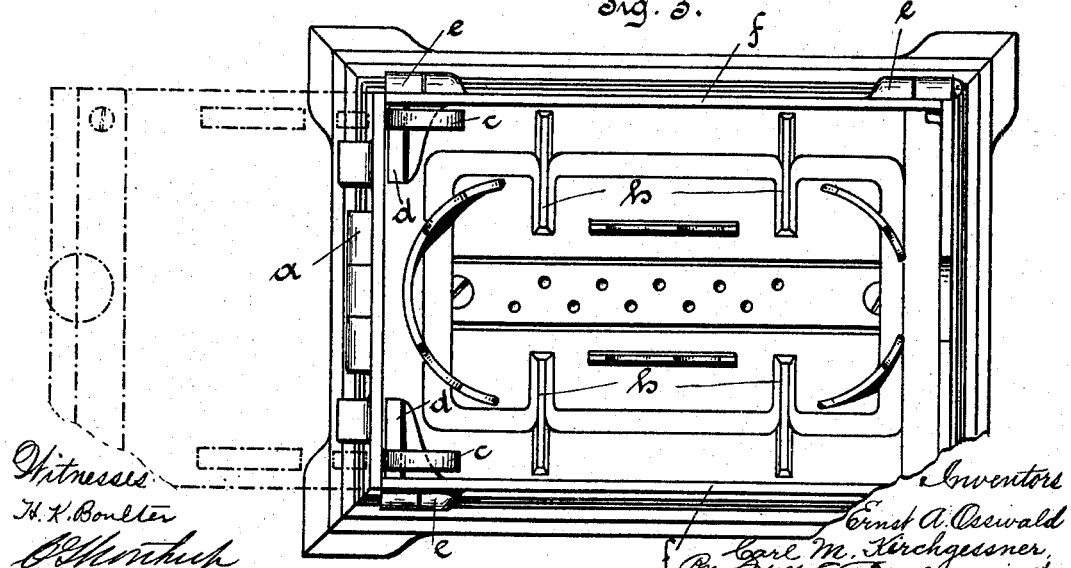

United States Patent Office.

ERNST ALBERT OSSWALD AND CARL MARIA KIRCHGESSNER, OF DRESDEN, GERMANY.

HEATING DEVICE USED IN MAKING OR RENOVATING HATS.

SPECIFICATION forming part of Letters Patent No. 590,236, dated September 21, 1897.

Application filed March 23, 1897. Serial No. 628,863. (No model.)

*To all whom it may concern:*

Be it known that we, ERNST ALBERT OSSWALD and CARL MARIA KIRCHGESSNER, subjects of the King of Saxony, residing at Dresden, Saxony, Empire of Germany, have invented a certain new and useful Improved Heating Device for Use in Making or Renovating Hats and the Like, of which the following is a specification.

The present invention relates to a device for heating irons and pads, such as are used in making, renovating, or touring felt or silk hats and the like, in which the source of heat is arranged under a box, the hinged cover of which when opened causes at the same time the two side walls to turn outward to a certain angle, these side walls returning to their original positions when the cover is closed.

This device has for its object to retain the heat given off by a Bunsen or like burner or any other heating device in the closed box and to use it for heating the irons and at the same time to heat the movable cover.

When ironing and afterward polishing or brushing hats, it has hitherto been usual to heat the iron as much as required for ironing on a stove, and after ironing the iron was placed on the bench, so that its lower surface was exposed and could be utilized for heating the velvet or other pad. Such a method is not satisfactory, as in consequence of the air surrounding the irons it was difficult to heat them properly and equally, even when using a large supply of heat, and, further, as they cool very rapidly during the ironing operation they cannot afterward properly heat the pads, whereby a loss of time is caused or the work is not done properly. According to the present invention these drawbacks are avoided by retaining the heat given off from any suitable heating device in a closed receiver. Thus not only the iron, but also the metallic cover, is heated, so that the operator is not dependent on the irons, but can by placing them on the cover heat the pads in a uniform manner and to the degree required.

In the accompanying drawings, Figure 1 is a cross-section, Fig. 2 a longitudinal section, and Fig. 3 a plan, of the device according to the present invention, the dotted lines indicating the open position of the box.

The device is constructed and operates as follows:

The combined cover and end wall $b$ is hinged to the base at $a$ and carries lugs or catches $c$ $c'$. Upon the cover being raised the side walls $f f$ of the box are turned outward about their pivots $e e$ into an oblique position by means of the lugs $c c'$, arranged over and under corresponding projections $d d$ on the side walls. In such position the operator can conveniently place the iron $g$ on the grating or base $h$, whereby said iron becomes exposed to the heat from the burner or source of heat, which in the present instance is assumed to be a Bunsen burner.

In order to utilize the heat to the best advantage, the cover $b$ must be closed, so that it is heated at the same time to a sufficient extent to enable the operator to use it as a heating-plate for the pad or cushion, the walls $f f$ closing in when the cover $b$ is closed, so that the iron is completely shut up in the box.

We claim—

1. A heating device for use in the manufacture or renovation of hats and the like, consisting of a box or receiver having pivoted sides and cover, a burner or heating device on its under side, and means for raising and lowering the sides when the cover is opened or closed, substantially as and for the purpose described.

2. A heating device of the character described, consisting of a base-plate, sides pivoted thereto, said sides provided with projections and a pivoted end and cover provided with the projections which engage with projections on the pivoted sides of the box, substantially as described.

3. A heating device of the character described, consisting of a base-plate $h$, pivoted end and cover $b$, having catches or projections $c c'$, which engage with projections $d d$, on the pivoted sides $f f$ of the box, substantially as described.

In testimony whereof we have hereto set our hands in the presence of the two subscribing witnesses.

ERNST ALBERT OSSWALD.
CARL MARIA KIRCHGESSNER.

Witnesses:
HERMANN GÖHRING,
HERNANDO DE SOTO.